United States Patent [19]

Gardner et al.

[11] Patent Number: 4,690,164

[45] Date of Patent: Sep. 1, 1987

[54] VALVE ASSEMBLY AND METHOD OF MAKING SAME

[75] Inventors: John F. Gardner, Loveland; Gerald H. Morton, Cincinnati, both of Ohio

[73] Assignee: Xomox Corporation, Cincinnati, Ohio

[21] Appl. No.: 669,598

[22] Filed: Nov. 8, 1984

[51] Int. Cl.⁴ .............................................. F16K 51/00
[52] U.S. Cl. ..................................... 137/15; 137/315; 251/144; 29/157.1 R
[58] Field of Search ................... 137/1, 315, 15; 29/157.1 R; 251/144, 305, 306; 222/556, 557; 285/158

[56] References Cited

U.S. PATENT DOCUMENTS

| | | | |
|---|---|---|---|
| 2,713,955 | 7/1955 | Harbers | 222/556 |
| 2,889,963 | 6/1959 | Johnson | 251/306 |
| 3,072,139 | 1/1963 | Mosites | 251/306 |
| 3,233,861 | 2/1966 | Stillwagon | 251/306 |
| 3,420,501 | 1/1969 | Fritz | 251/305 |
| 3,656,710 | 4/1972 | Shaw | 251/144 |
| 4,184,663 | 1/1980 | Rollins et al. | 251/144 |
| 4,394,002 | 7/1983 | Polley | 251/144 |
| 4,422,473 | 12/1983 | Polley | 251/144 |
| 4,440,379 | 4/1984 | Behle et al. | 251/144 |

*Primary Examiner*—A. Michael Chambers
*Attorney, Agent, or Firm*—Kinney & Schenk

[57] ABSTRACT

A valve assembly for a fluid-containing tank and method of making same are provided wherein such valve assembly has a flow passage therethrough and such flow passage has a central rectilinear flow axis and an inlet and an outlet which have central axes common with such axis. the valve assembly has a device which is operable from the bottom of its tank and is movable between open and closed positions thereof and once moved to its open position enables substantially free unobstructed flow of fluid through the valve assembly parallel to the axis and with minimum pressure drop to thereby enable a maximum rate of fluid transfer through such valve assembly, and the inlet is adapted to provide complete drainage of fluid within the tank.

13 Claims, 9 Drawing Figures

VALVE ASSEMBLY AND METHOD OF MAKING SAME

BACKGROUND OF THE INVENTION

1. Field of the Invention

This invention relates to a valve assembly for a fluid-containing tank and method of making same and in particular to such a butterfly valve assembly which is bottom operable and is particularly adapted to be used in such a tank of a railway tank car, or the like.

2. Description of Prior Art

It is known in the art to provide a valve assembly for a railway tank car which is operable from the bottom of such tank car and such valve assembly may be disposed within the tank car or below the bottom of such car.

However, the Association of American Railroads (AAR) and the Department of Transportation (DOT) have railway tank car regulations which requires that projections extending in excess of 1 inch below the bottom of the tank of such a car must be protected by a skid, or if such a projection is part of a valve assembly associated with the tank car it must be capable of being sheared away without affecting the integrity of such valve assembly. In instances where a skid is provided this skid must be in the form of a ramp having a longitudinal dimension along the bottom of the tank which is three times the dimension projecting downwardly from such bottom.

U.S. Pat. Nos. 4,016,907 and 4,394,002, and copending U.S. patent application Ser. No. 549,200, for example, now U.S. Pat. No. 4,542,763, issued 09/124/85 disclose bottom operable butterfly valves for railway tank cars which extend below the bottom of the tank car and require protection.

U.S. Pat. Nos. 4,212,447 and 4,318,531, for example, disclose bottom operable valves disposed within such a tank car but such valves are of comparatively complex construction.

In addition, copending U.S. patent application Ser. No. 459,462 now U.S. Pat. No. 4,518,149 issued 05/21/85, also discloses a valve assembly for such a tank car wherein the valve assembly is disposed within the tank car; and such application also discloses the use of a butterfly valve assembly.

However, each tank car valve assembly of the character mentioned which has been proposed heretofore and is operable from the bottom of such tank car is deficient in certain respects. In particular, such a valve assembly either requires protection by a skid of the character mentioned; is of comparatively complex and expensive construction, or does not provide complete drainage of its associated tank.

SUMMARY OF THE INVENTION

This invention provides an improved valve assembly for a fluid-containing tank, such as, a tank of a railway tank car which overcomes the above-mentioned deficiencies. Such improved valve assembly is mounted on a saddle fixed to the bottom portion of the tank and the valve assembly comprises a housing structure having a fluid inlet and a fluid outlet defined therein with the inlet and outlet being interconnected by a flow passage therebetween. The valve assembly has means for mounting the housing structure against the saddle and substantially within the confines of the tank and also has bottom operable means carried by the housing structure and movable between an open position thereof and a closed position thereof to shut off fluid flow through the flow passage with the inlet and the outlet being defined in the housing structure on a common rectilinear flow axis which is the central axis of the flow passage. The bottom operable means has the said closed position thereof at a location between the inlet and the outlet and such bottom operable means once moved to its open position enables substantially free unobstructed flow of fluid through the valve assembly parallel to the axis and with minimum pressure drop to thereby enable a maximum rate of fluid transfer through the valve assembly.

In accordance with one embodiment of the improved valve assembly of this invention the inlet of the housing structure is adapted to provide complete drainage of fluid within the tank.

Accordingly, it is an object of this invention to provide an improved valve assembly of the character mentioned.

Another object of this invention is to provide an improved method of making a valve assembly of the character mentioned.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which.

DETAILED DESCRIPTION

Figure 1:
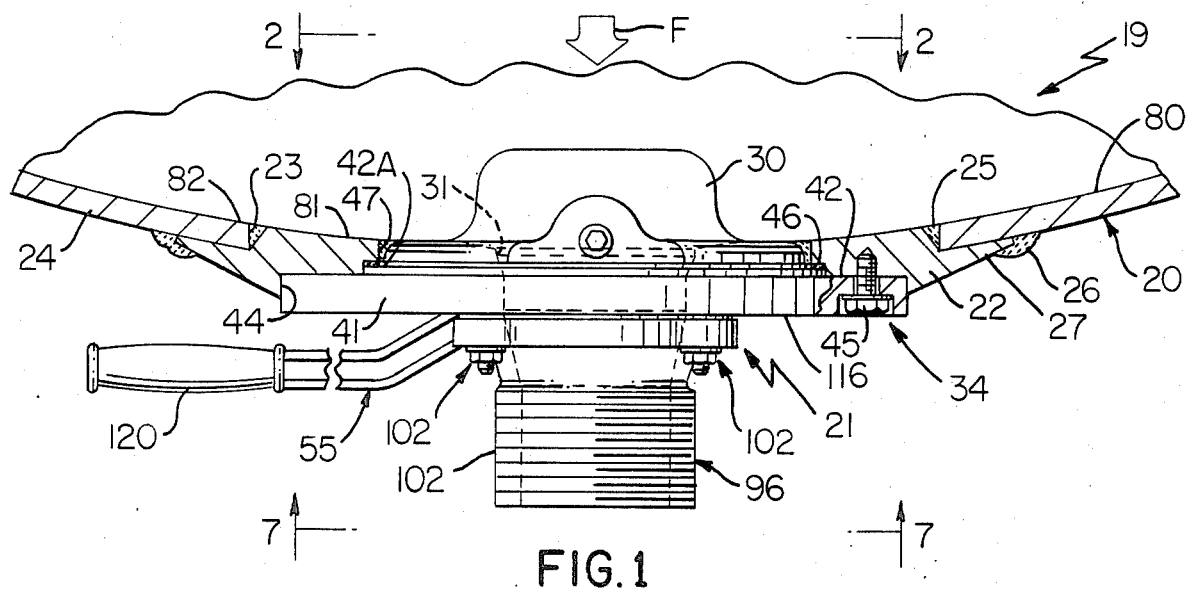
FIG. 1 is a view with parts in cross section, parts in elevation, and parts broken away illustrating one exemplary embodiment of the valve assembly of this invention mounted at the bottom of an associated railway tank car and with such valve assembly shown in a closed position.

Reference is now made to FIG. 1 of the drawings which illustrates a fragmentary portion of a railway tank car which is designated generally by the reference numeral 19 and such railway tank car has a fluid containing tank 20 which is particularly adapted to contain a fluid for transportation, usage, and/or storage. The contained fluid may be any suitable fluid, designated schematically by a reference arrow F, and generally is in the form of a liquid, usually under positive pressure. The tank 20 utilizes one exemplary embodiment of the valve assembly of this invention and such valve assembly is designated generally by the reference numeral 21.

The valve assembly 21, being usable on fluid-containing tanks of railway tank cars, is distinguishable from valves, or the like, commonly used on a so-called railway hopper car. This latter type of car is used to contain a solid material such as particulate material, or the like, and each of such hopper cars employs a completely different type of valve or gate, which is usually not fluid tight, for emptying same.

The tank 20 has a mounting saddle 22 suitably fixed to the bottom portion thereof and such saddle 22 is disposed within a substantially circular cutout 23 in the wall 24 of such tank 20. Although the saddle 22 may be fixed in position by any suitable means, it is preferably fixed to the tank 20 by an internal circular weld 25 and an external circular weld 26 provided at the outer circumferential edge of a radially extending portion 27 of saddle 22. The saddle is generally of the order of several times thicker than the thickness of the wall 24 of the tank 20 whereby the installation of the saddle 22 and the valve assembly 21 at the bottom of the tank does not result in a structural weakening of such tank 20.

Figure 3:
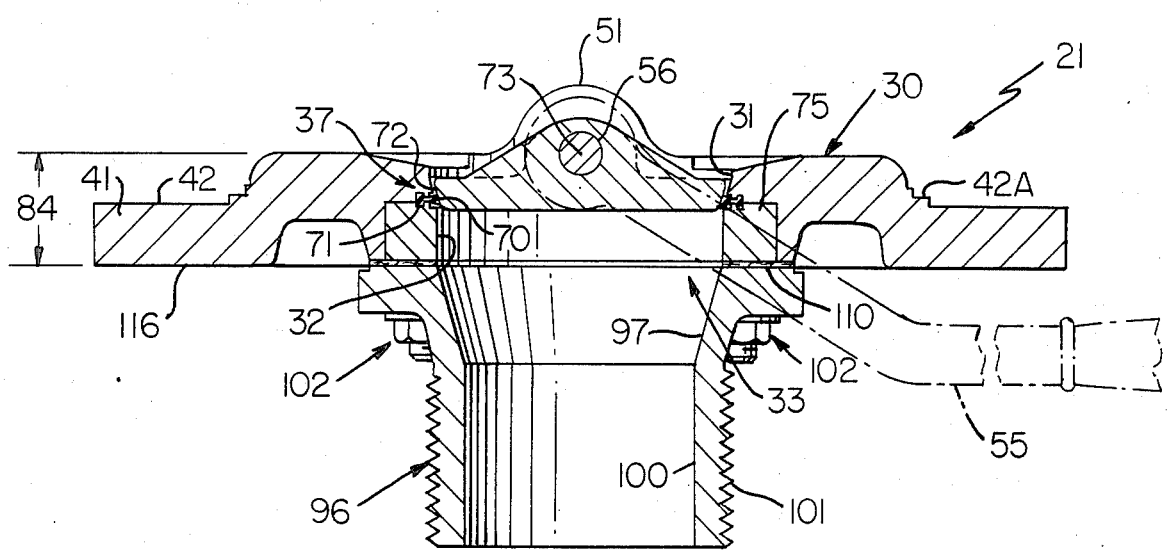
FIG. 3 is a cross-sectional view taken essentially on the line 3—3 of FIG. 2 and showing, with dot-dash lines, the position of an actuating handle for such valve assembly.
Figure 4:
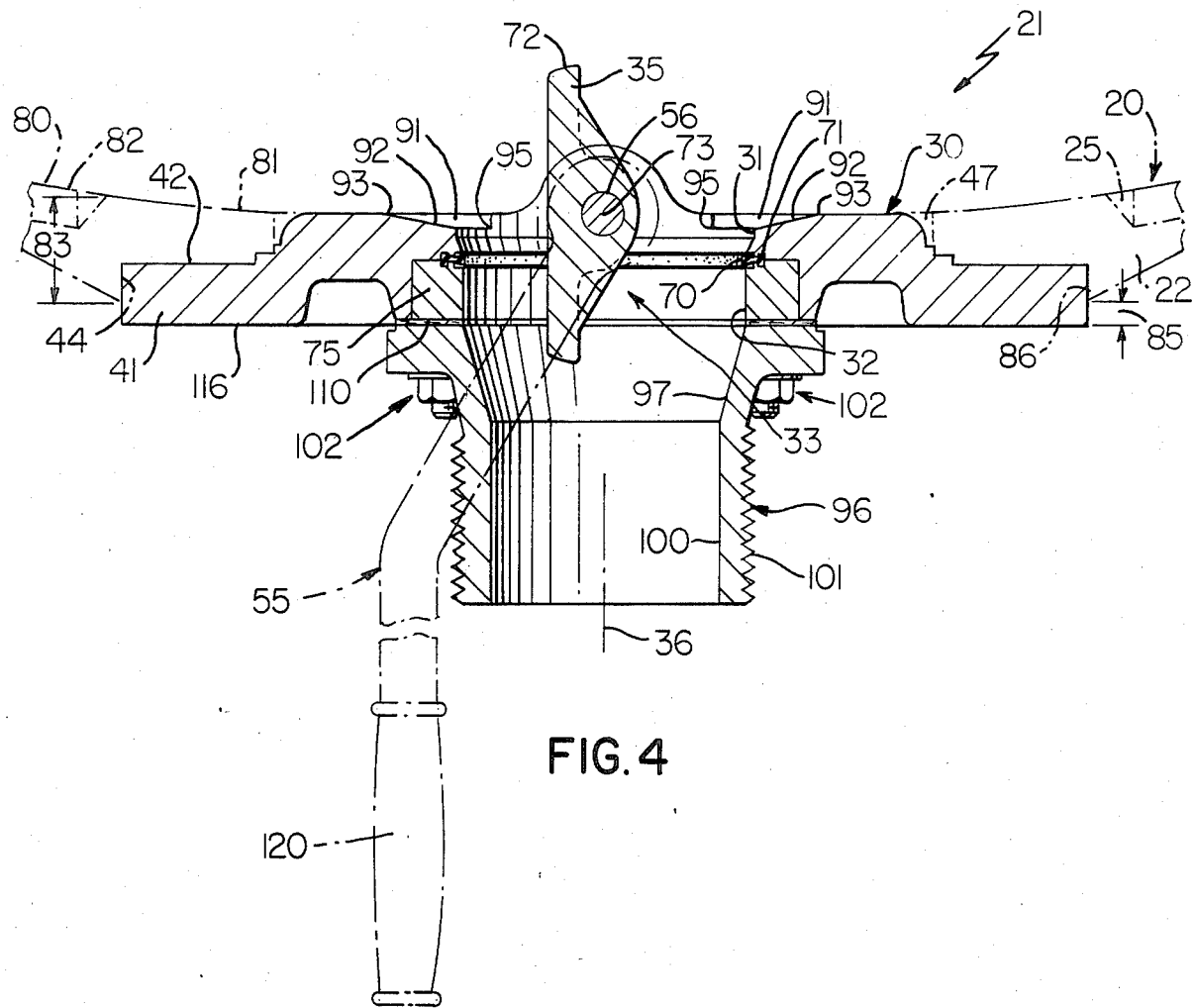
FIG. 4 is a cross-sectional view similar to FIG. 3 and showing such valve assembly in its open position.

The valve assembly 21 comprises a housing structure which is designated generally by the reference numeral 30; and, as seen in FIGS. 3 and 4 such housing structure 30 has a fluid inlet 31 and a fluid outlet 32 defined therein with such inlet and outlet being interconnected by a flow passage 33 therebetween. The valve assembly 21 also has means for mounting the housing structure against the saddle 22 with such mounting means being designated generally by the reference numeral 34 (FIG. 1); and, the mounting means 34 is used to mount the housing structure substantially within the confines of the tank.

Figure 8:
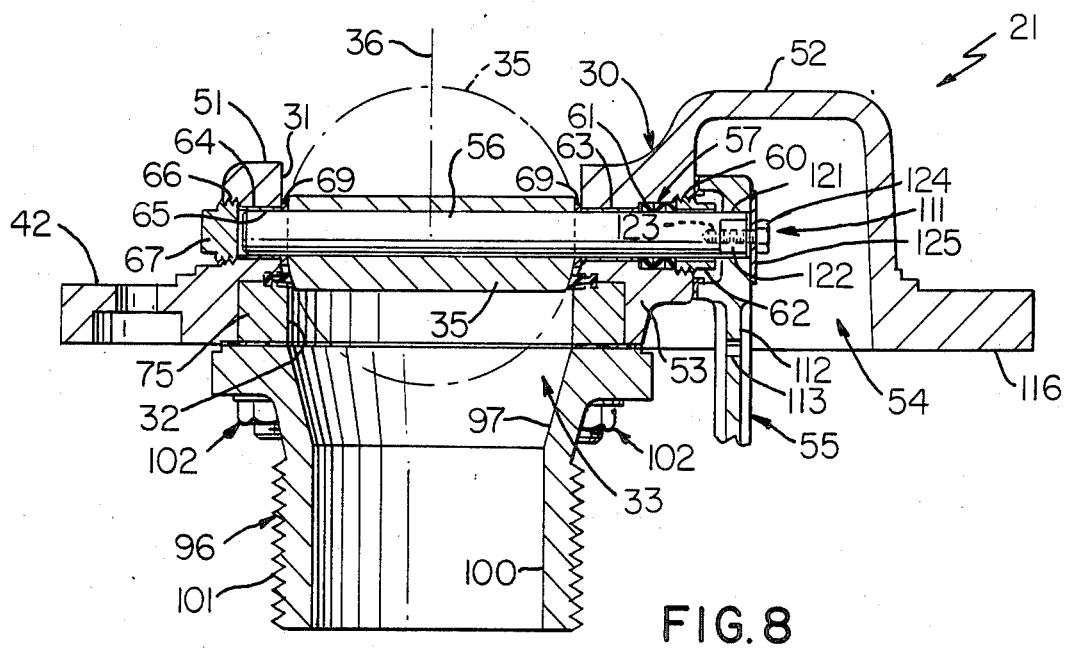
FIG. 8 is a primarily cross-sectional view taken essentially on the line 8—8 of FIG. 7.

The valve assembly 21 has a bottom operable means or member 35 which, as best seen in FIG. 8, is carried by the housing structure 30. The member 35 is movable between an open position thereof, shown in FIG. 4, and a closed position thereof, shown in FIG. 3, and is adapted to shut off fluid flow through the flow passage 33 and hence shut off fluid attempting to flow out of the tank 20 through the valve assembly 21.

The inlet 31 and outlet 32 are defined in the housing structure 30 on a common rectilinear flow axis, which is indicated by dot-dash lines 36 in FIGS. 4 and 8; and is the central axis of the flow passage 33. The bottom operable means 35, in its closed position, is disposed and has such closed position defined at a location roughly midway between the inlet 31 and the outlet 32 and as shown at 37 in FIG. 3. The bottom operable means 35 once moved to its open position, shown in FIG. 4, enables substantially free unobstructed flow of fluid F through the valve assembly 21 substantially parallel to the axis 36, i.e., along axis 36, and with minimum pressure drop to thereby enable a maximum rate of fluid transfer through the valve assembly 21.

It will also be seen that with the valve assembly 21 mounted at the bottom of the tank 20 the inlet 31 of the housing structure 30 is adapted to provide complete drainage of fluid F present within the tank 20. It will also be appreciated that the flow of fluid along the axis 36 is a basically rectilinear vertical flow whereby fluid flow through valve assembly 21 is achieved in an efficient manner.

As previously mentioned, the assembly 21 has mounting means 34 for mounting same to the saddle 22 and such mounting means 34 comprises an annular disc-like portion 41 having an annular planar surface 42, which has a stepped gasket engaging annular surface 42A disposed inwardly thereof; and, it will be seen that the flow axis 36 extends perpendicular to the planar mounting surface 42 (FIG. 1.)

The annular disc-like portion 41 comprising the mounting means 34 is disposed within a corresponding cutout 44 in the central bottom portion of the saddle 22; and, the mounting means 34 also comprises a plurality of threaded bolts 45 which have threaded inner end portions threadedly received within corresponding threaded portions in the saddle 22 and each bolt is provided with an associated washer which may be a lock washer, or the like. An annular gasket or sealing ring 46 is also provided in a stepped cutout in the saddle 22 and compressed in sealed relation once the disc-like portion 41 is fastened in position by bolts 45. The ring 46 may be made of a suitable polymeric material (such as, a suitable fluoroplastic), asbestos, spiral wound asbestos filled metal gasket, or other suitable material.

Once the valve assembly 21 is mounted in position utilizing the bolts 45 a suitable caulking material 47 is preferably provided between its peripheral inner edge and the wall 24 of tank 20. The caulking material 47 may be made of the same or a similar material as the sealing ring 46; and, in this example, is preferably a suitable fluoroplastic. In any event, the caulking material 47 is compatible with the fluid F being transported in the tank 20 of the tank car 19.

Referring again to FIGS. 8 and 9 of the drawings it is seen that the housing structure 30 has a central portion 50 which extends upwardly within the tank 20 from the mounting surface 42 once the housing structure 30 is mounted in position. The central portion 50 is divided into roughly two parts 51 and 52 respectively which are separated by a wall 53 and such wall extends perpendicular to the mounting surface 42. One of the parts, shown as part 51 in this example, has the inlet 31 and outlet 32 associated therewith; and, the other of the parts, shown as the part 52 in this example, cooperates with the wall 53 to define an inverted cup-shaped portion 54 having an open end which opens to ambient and is adapted to receive therewithin an actuating handle 55 for the member 35, and such handle 55 will be described in more detail subsequently.

The valve assembly 21 of this invention is preferably a butterfly valve assembly 21 whereby the housing structure 30 is the housing structure of a butterfly valve assembly. Further, it will be appreciated that the bottom operable means 35 is the closure member or disc 35 of such butterfly valve assembly 21—FIG. 8. The valve member 35 has substantially horizontally disposed actuating stem means, shown as a horizontal actuating stem 56, which is suitably detachably fixed to the valve member or disc 35. The housing structure 30 of assembly 21 has stepped bore means 57 in the wall 53 terminating in a threaded end part 60. The bore means 57 is adapted to receive the actuating stem 56 therethrough in sealed relation so that an outer end of stem 56 is disposed in the inverted cup-shaped portion 54 and is accessible through the open end of portion 54 for attachment of handle 55 thereto.

The sealed relation between the stem 56 and wall 53 is provided by packing means 61 therebetween. Thus, the packing means 61 serves to prevent leakage of fluid F from within the tank 20 through the bore means 57, i.e., between the stem 56 and such bore means 57, and through the cup-shaped portion 54. The packing means 61 comprises packing which may be comprised of a plurality of chevron-type packing rings (or the like) and a suitable follower. A threaded adjustment member 62 is provided and is threadedly received within threaded part 60 in the wall 53. The threaded member 62 is rotatable into and out of threaded engagement with the threaded part 60 to thereby compress the packing 61 or relieve compression thereon as is known in the art and thereby control the fluid tightness of the seal between the wall 53 and the stem 56 at one end thereof. A suitable antifriction bearing sleeve 63 is disposed between the stem 56 and bore means 57 inwardly of packing means 61.

The housing structure 30 also has bore means or a bore 64 in an end of part 51 of its central portion 50. The bore 64 is adapted to receive therethrough the end portion of the stem 56 which is opposite the packing means 61. A suitable antifriction bearing sleeve 65 is disposed between the inside surface defining bore 64 and the stem 56. The bore 64 has a threaded outer end 66 and a threaded member 67 is threadedly received in the threaded outer end 66.

Thus, it is seen that the stem 56 is supported at its opposite end portions by antifriction bearings 63 and 65 which are disposed in bore means 57 and 64 respectively. It will also be seen that a pair of annular spacers 70 are provided at opposite ends of the disc 35 and around the stem 56 and such spacers 69 align the disc 35 in position as is well known in the art.

Referring again to FIGS. 3 and 4 of the drawings it is seen that the housing structure 30 has the previously described flow passage 33 therethrough and first sealing surface means in the form of a sealing surface 70 which is provided on a sealing member 71.

As previously mentioned, the valve assembly 21 has closure member or closure disc 35 which is of circular outline, and is provided for controlling fluid flow through the flow passage 33. The closure disc 35 has second sealing surface means in the form of a sealing surface 72 which is adapted to engage the first sealing surface means or sealing surface 70 to prevent fluid flow through the passage 33 and thereby shut off fluid flow through the valve assembly 21. The sealing surface 72 is provided on the disc 35 about the periphery thereof and such disc is mounted for partial rotation or pivotal movement within the flow passage 33 to open and close the valve assembly 21.

The disc 35 is mounted in the housing structure 30 employing the single shaft or stem 56; however, it will be appreciated that, if desired, such disc may be mounted utilizing a pair of stems which are disposed coaxially substantially on a diametral line through the disc.

The disc 35 is disposed with respect to its axis which is common with the longitudinal axis 73 of the stem 56 so that such disc is eccentric or offset in two mutually perpendicular directions with respect to axis 73 in a manner which is well known in the art of butterfly valves and for purposes which are also well known and thus will not be described in detail herein. The two eccentricities, in essence, provide a cam-like action to the movement of the disc 35 as it is pivoted approximately 90 degrees between fully open and fully closed positions whereby the disc 35 is not subjected to a constant scrubbing of the valve sealing surfaces and thereby is free of excessive disc drag and sealing surface deformation for well known reasons yet the disc 35 still provides a fluid-tight seal in its closed position.

In this disclosure of the invention, the sealing member 71 has been illustrated as being carried by the housing structure 30 of the valve assembly 21; and, such sealing member 71 is illustrated as being of a particular configuration. However, it is to be understood that such sealing member may be of any suitable configuration which is known in the art and typical configurations are illustrated in U.S. Pat. No. 4,289,296, the disclosure of which is incorporated herein by reference thereto. Likewise, the sealing member 71, regardless of its configuration may be made of a suitable material or materials as known in the art which may include metallic and/or nonmetallic materials.

Figure 6:
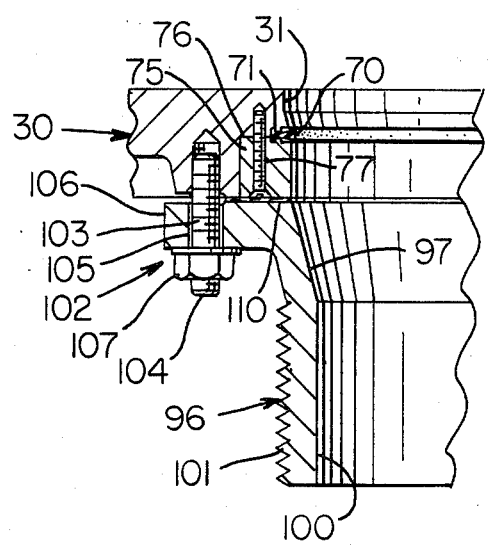
FIG. 6 is a fragmentary cross-sectional view taken essentially on the line 6—6 of FIG. 2 and with the closure disc of the valve assembly not shown.

The member 71 is preferably detachably fixed in position using any suitable means; and as seen in FIG. 6 a retainer ring 75 is used for this purpose. The ring 75 is disposed within a cooperating substantially annular cutout 76 in the housing structure 30; and, such ring 75 is suitably detachably fixed in position by any suitable fastening means. The ring 75 is preferably fixed in position by a plurality of threaded fastening screws 77. Further, it will be appreciated that the ring 75 and housing structure 30 have suitable cooperating cutouts therein to receive the base portion of sealing member 71 to hold same firmly in position.

Referring again to FIG. 1 of the drawings it is seen that the tank 20 has an inside surface 80. The saddle 22 has an innermost surface 81 which blends smoothly with lowermost portion 82 of the inside surface 80. In accordance with the teaching of this invention, the fluid inlet 31 is disposed with respect to the innermost surface 81 and lowermost surface portion 82 to enable the, previously mentioned, complete drainage of fluid F within the tank and by the action of gravity.

It will also be seen that the saddle 22 has a maximum thickness 83 which is illustrated in FIG. 4. Further, due to the construction of the butterfly valve 21, the housing structure 30 thereof has a thickness 84 (FIG. 3) over its major portion, when viewed parallel to the flow axis 36, which is substantially equal to the maximum thickness 83. It will also be seen that the housing structure 30 has a downwardly extending portion 85 which extends beneath a bottom annular projection 86 of the mounting saddle 22 with the housing structure mounted in position against such saddle. The downwardly extending portion 85 is sufficiently small in its downward dimension to preclude the need for a protective skid for the valve assembly 21 when using same as a lading valve of a railway tank car.

Referring again to FIGS. 1 and 9 of the drawings, it is seen that the housing structure 30 of this example of the invention has an integral bottom portion comprising disc-like portion 41 defined as an integral part thereof. The housing structure 30 also has its central portion 50 which is disposed substantially within the confines of the tank 20 with the housing structure 30 mounted in position against the saddle 22. The central portion 50 has the inlet 31 disposed with respect to the innermost surface 81 and lowermost surface portion 82 to enable the previously mentioned complete drainage by gravity. The disc-like portion 41 and central portion 50 may be made as a single-piece structure, as shown in this example, or may be made of plurality of suitably welded or otherwise permanently fixed portions.

As described earlier the mounting means 34 comprises the mounting surface 42 which is disposed against the saddle 22, and the flow axis 36 extends substantially perpendicular to mounting surface 42. In addition, the horizontally disposed actuating stem means or stem 56 is disposed inwardly of the mounting surface 42 and within the confines of the tank 20. The stem 56 is also disposed substantially parallel to the mounting surface 42 and such stem is a rotatable actuating stem which is rotatable through an angular increment generally of the order of 90 degrees between its closed and open positions.

Figure 2:
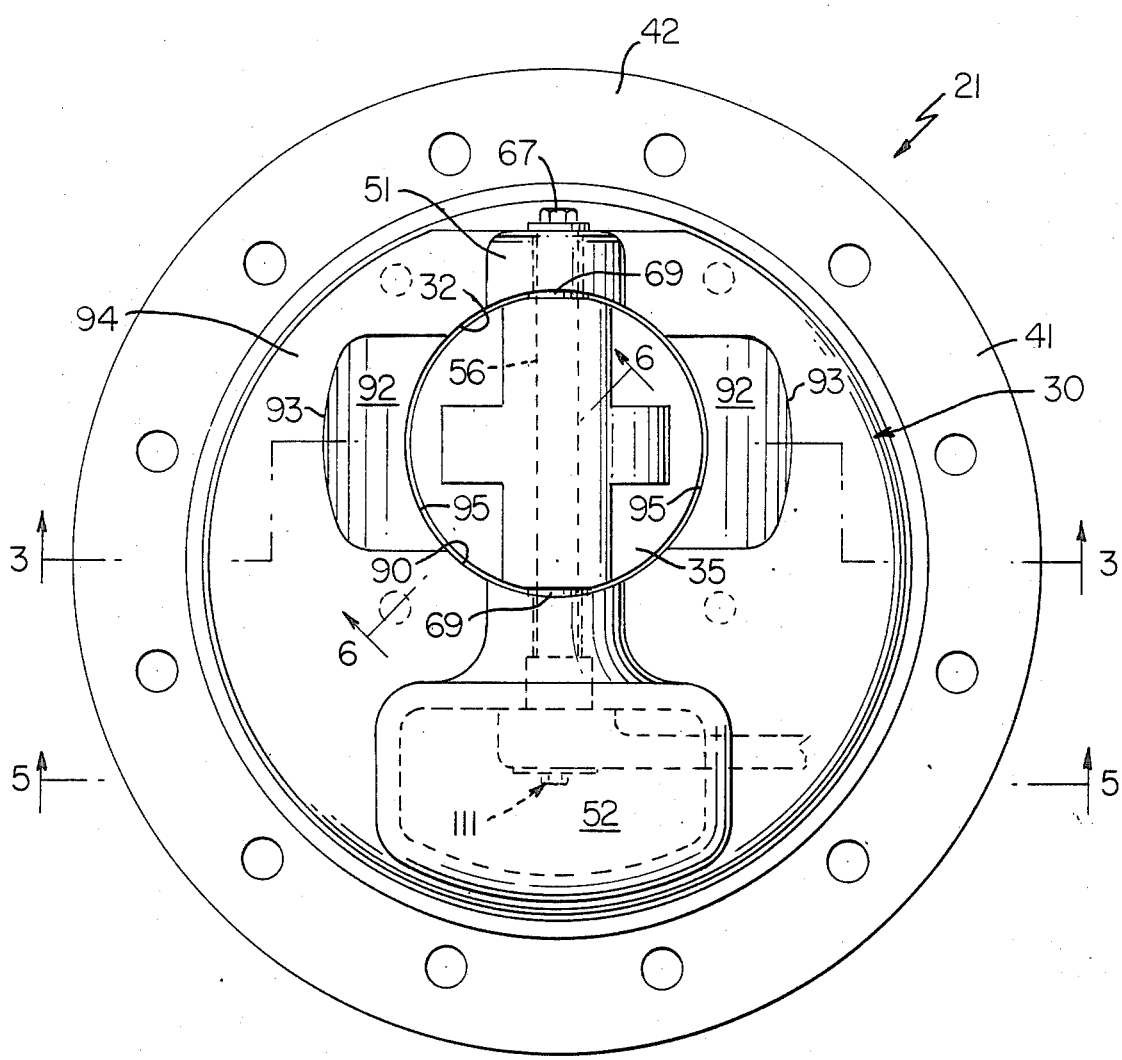
FIG. 2 is an enlarged view of the valve assembly of FIG. 1 rotated 180 degrees and taken essentially on the line 2—2 of FIG. 1.
Figure 9:
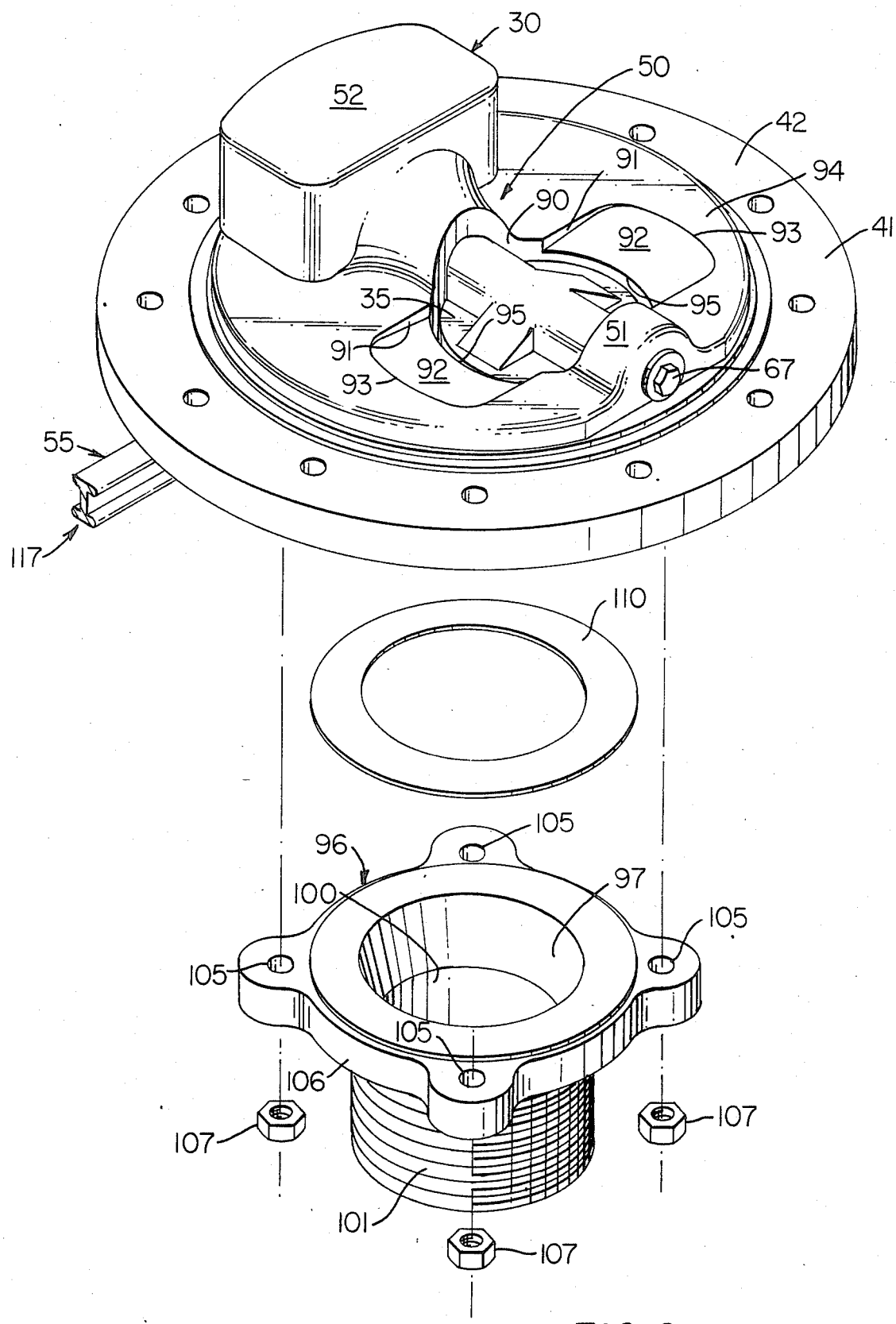
FIG. 9 is an exploded isometric view with parts in cross section and parts broken away showing the valve assembly of this invention away from its mounting saddle.

Referring now to FIGS. 2 and 9 of the drawings it is seen that part 51 of central portion 50 of the housing structure 30 has a cutout 90 therein. The major portion of the housing structure also has a pair of wedge-shaped cutouts 91 through its thickness 84. The cutouts 90 and 91 cooperate to expose a large portion of the periphery of the inlet 31, which is substantially circular, to facilitate the previously described complete drainage of the tank 20.

It will also be seen that each wedge-shaped cutout 91 provides a downwardly inclined drain surface 92 having an upper edge 93 (FIGS. 2, 4 and 9) disposed substantially coplanar with a peripheral annular portion 94 of thickness 84. Each drain surface 92 has a lower edge 95 which, as shown in FIG. 4, merges smoothly with the inlet 31. Thus, the previously described complete drainage of the tank 20 is assured without likelihood of trapping any fluid in such tank.

The construction and arrangement of cutouts 90 and 91 will be readily apparent in FIG. 4 where it is seen that such cutouts and inlet 31 define the lowermost part of the tank 20. Yet, it will be noted that the stem 56 is completely isolated within the tank 20 and in the event of car derailment is basically completely protected from normal operation thereof.

The valve assembly 21 has a readily shearable adapter 96 which is fastened to such valve assembly 21 to facilitate emptying of the tank 20. As seen in FIGS. 6 and 9 the adapter 96 in this example of the invention has an outwardly, i.e., downwardly, converging frustoconical inlet passage portion 97 which communicates with the outlet 32 and an outlet passage portion 100. The adapter 96 also has a threaded male connector 101 defining its terminal outer end portion. The threaded connector 101 is particularly adapted for attachment to a suitable conduit or pipe to facilitate the emptying of the tank 20 into a desired container, receptacle, conduit system, or the like.

The adapter 96 (FIG. 6) is fastened in position utilizing a plurality of shearable fasteners which are designated generally by the reference numeral 102. The fasteners 102 may be of any suitable type known in the art and this example of the invention comprise a plurality of shearable studs 103 each having one end portion threaded within the housing structure 30 and threaded outer end portion 104. The adapter has openings or cylindrical bores 105 in a mounting flange 106 therefor, and each end portion 104 is received through an associated bore 105 and threaded nuts 107, used with associated washers, are threaded on portions 104 to hold the mounting flange and adapter 96 against the valve assembly 21. A sealing gasket 110 is sandwiched between the flange 106 and housing structure 30.

The studs 103 are designed such that once a force of predetermined magnitude is applied against the adapter 96 the studs 103 are sheared thereby shearing the adapter 96 away from the bottom of the tank 20. Thus, with the adapter 96 being easily shearable and the handle 55 also being shearable, as will be described subsequently, away from the valve assembly 21 nothing remains projecting beneath the bottom of the tank 20 that would tend to damage the valve assembly 21. Accordingly, the valve assembly 21 can be readily opened in an emergency, if desired.

As previously mentioned, the valve assembly 21 has an actuating handle 55 for the disc 35 and such handle has means 111, as shown in FIG. 8 for detachably fastening an inner end portion 112 thereof to the actuating stem 56; and, the handle 55 has means enabling shearing thereof in the form of cutout means shown as an opening 113 (FIG. 5) in the inner portion 112 of such handle 55. The shearing means or opening 113 enables shearing of the handle in the event of application of a shearing force thereagainst and such shearing force would be provided in the event of derailment of the railway tank car 19.

Figure 5:
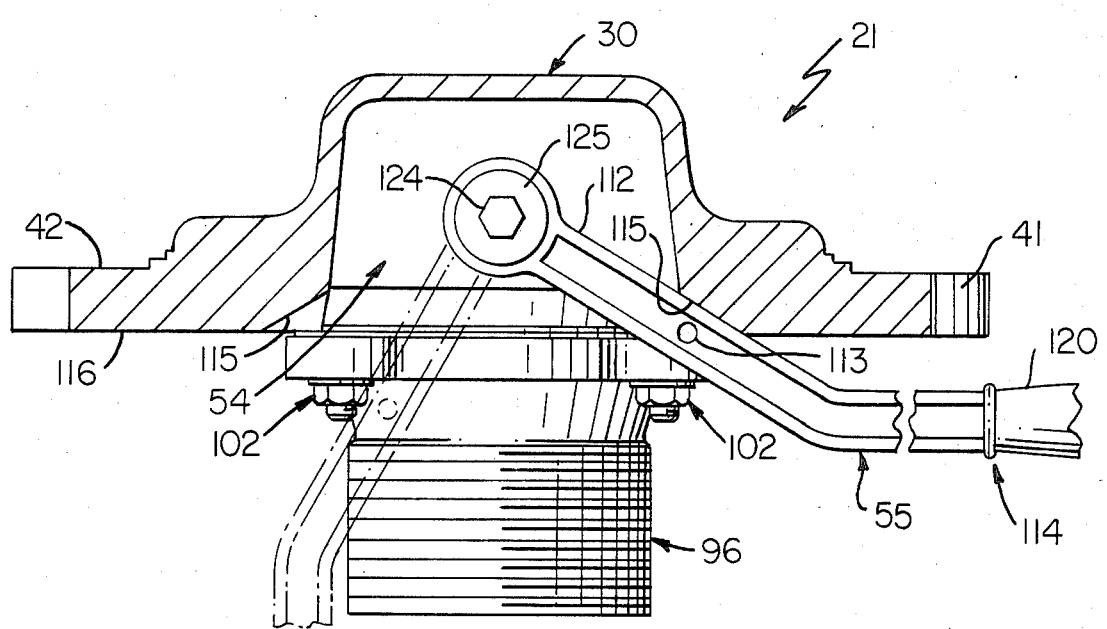
FIG. 5 is a view taken essentially on the line 5—5 of FIG. 2 and showing the actuating handle by solid lines in its closed position and by dot-dash lines in its open position.
Figure 7:
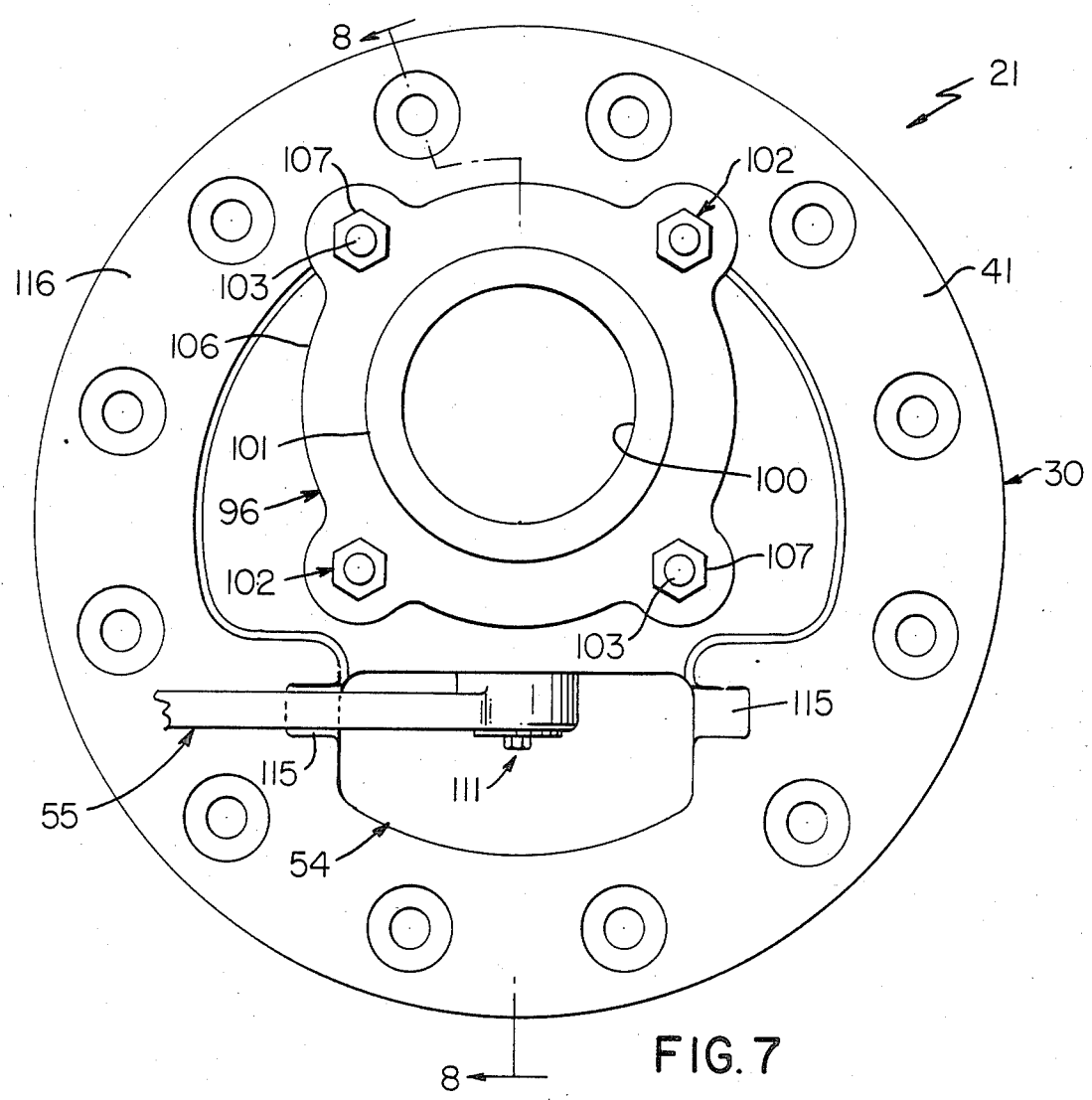
FIG. 7 is a view taken essentially on the line 7—7 of FIG. 1 and with the valve having been rotated in a similar manner as the illustration of FIG. 2.

It will be appreciated that should car derailment occur, shearing forces would be applied against the handle 55 in the position of such handle illustrated at 114 in FIG. 5 so as to engage the handle and tend to move same perpendicular to the plane of the paper with the valve assembly 21 mounted on the tank car 19. It will also be seen that a pair of cutouts 115 are provided in the housing structure 30 (FIG. 7) and the cutout 115 associated with the closed position of the valve is adapted to receive and hold the inner portion 112 of the handle 55 therein so that the shearing forces are assured of being applied as described above. As shown, the weakening means or opening 113 is provided such that it is adjacent and preferably bisected by a plane which coincides with the bottom surface 116 of the disc-like portion 41 whereby with the inner portion 112 in its closed position and nested within cutout 115 such disc-like portion provides a structure against which the handle 55 is urged to promote shearing of the parts thereof adjacent opening 113.

As seen in FIG. 9, the inner end portion 112 of the exemplary handle 55 has a substantially I-shaped cross section, as shown at 117, and the opening 113 is provided in the central web of the I-shaped cross section, between the opposed flanges thereof. The cutout means or opening 113 serves to reduce the effective area of the I-shaped cross section at least at one location along such cross section. Further, it will be appreciated that instead of cylindrical opening means 113 such weakening or opening means 113 may be defined as one or more suitable notches in the inner portion 112 of the handle 55. It will also be appreciated that the handle 55 may be of any suitable cross-sectional configuration, other than I-shaped, if desired.

The handle 55 also has a suitably contoured roughly cylindrical outer end portion 120 which is adapted to be grasped by hand. The outside surface of portion 120 may be suitably roughened or knurled and provided with annular ridges at opposite ends thereof to enable easier firm grasping.

Referring again to FIG. 8 the inner portion 112 of the handle 55 has an opening 121 provided with diametrically opposed flats (not shown) which are adapted to engage corresponding opposed flats 122 in the outer end portion of the stem 56. Once the handle 55 is installed in position on such outer end portion of the stem 56, rotation in either direction will produce rotation of such stem 56 and the valve member 35 provided as an integral part of the stem.

The outer end of the stem 56 is provided with internal screw threads 123; and, a threaded bolt 124 and washer 125 are provided for holding the inner end portion 112 of the handle 55 on the outer end of the stem 56. As will be readily apparent from the drawings the bolt 124 extends through an opening in the inner end of the handle and is threadedly received in the internal threads 123 with the washer bearing against the outside surface of the handle 55.

In accordance with the teachings of this invention, the valve assembly 21 is disposed substantially completely within the tank 20 and this arrangement solves numerous problems associated with so-called lading valves, or valves of this type, utilized on railway cars. Further, because only a small portion 85 (FIG. 4) of the valve assembly 21 projects beneath the body of the tank car 19, with portion 85 being roughly an inch, or less, there is no need to provide protective ramps or skids surrounding the disc-like portion 41 of the valve assembly.

The adapter 96 projects outwardly beyond, i.e., beneath, the bottom surface 116 of the disc-like portion 41. However, the adapter 96 as well as the outer portion of the handle 55, which are both beneath the bottom surface 64 are both easily or readily sheared off in case of accident while the valve assembly 21 is fully protected and functional even with the adapter 96 and outer portion of the handle 55 sheared away. In the event of such shearing the inverted cup-shaped portion 54 is such that with the handle 55 sheared away in the vicinity of the weakening opening 113, a so-called cheater bar, or the like, may be disposed around the remaining stub portion of the inner end 112 of the handle 55 to enable operation of the disc 35, as desired. It will also be seen that the previously described oppositely disposed cutouts 115 provided in the housing structure 30 enable the inner portion 112 of the handle 55 to be moved through the desired angular distance, generally of the order of 90 degrees, whereby the disc 35 is easily moved from its fully closed position, shown by the solid lines in FIG. 5, to the illustrated dotted line position of the disc 35.

In addition to the advantages presented above the butterfly valve assembly 21 of this invention has many other advantages including comparatively low cost, light weight, low torque to open and close, and better thermal cycling capability. This last mentioned item means that the valve assembly can be used at greater extremes of temperature with optimum efficiency and substantially no leakage in its closed position.

It will also be appreciated that the valve assembly 21 may employ suitable fire-resistant seal means for the disc 35 as well as so-called conventional seal means for such disc.

While present exemplary embodiments of this invention, and methods of practicing the same, have been illustrated and described, it will be recognized that this invention may be otherwise variously embodied and practiced within the scope of the following claims.

What is claimed is:

1. In a method of making a valve assembly for a fluid-containing tank which has a mounting saddle fixed to the bottom portion thereof, said method comprising the steps of, providing a housing structure having a fluid inlet and a fluid outlet defined therein, said inlet and said outlet being interconnected by a flow passage therebetween, providing means for mounting said housing structure against said saddle and substantially within the confines of said tank, supporting bottom operable means on said housing structure, said bottom operable means being movable between an open position thereof and a closed position thereof to shut off fluid flow through said flow passage, said inlet and said outlet being defined in said housing structure on a common rectilinear flow axis which is the central axis of said flow passage, said supporting step comprising supporting said bottom operable means so that it has its closed position at a location between said inlet and said outlet, said bottom operable means once moved to said open position enabling substantially free unobstructed flow of fluid through said valve assembly parallel to said axis and with minimum pressure drop to thereby enable a maximum rate of fluid transfer through said valve assembly, the improvement in said method wherein said step of providing said housing structure comprises providing said inlet of said housing structure which is adapted to provide complete drainage of fluid within said tank once said housing structure is mounted on said tank employing said mounting means, said tank having an inside surface with said saddle having an innermost surface which blends smoothly with a lowermost portion of said inside surface, said step of providing said housing structure comprises providing said housing structure having said inlet which is adapted to be disposed with respect to said innermost surface and lowermost portion to enable said complete drainage by gravity, said saddle having a maximum thickness, said step of providing said housing structure comprises providing said housing structure which has a thickness over the major portion thereof when viewed parallel to said flow axis which is substantially equal to said maximum thickness, and said step of providing said housing structure also comprises providing said housing structure with a comparatively small downwardly extending portion which extends beneath a bottom annular projection of said mounting saddle with said housing structure mounted in position against said saddle, said downwardly extending portion being sufficiently small to preclude the need for a protective skid for said valve assembly when using same as a lading valve of a railway tank car.

2. A method as set forth in claim 1 wherein said step of providing a housing structure comprises providing a housing structure which is the housing structure of a butterfly valve and said step of supporting bottom operable means comprises supporting bottom operable means in the form of a closure disc of said butterfly valve.

3. A method as set forth in claim 2 in which said step of providing a housing structure comprises providing said housing structure which has, an integral bottom portion, said mounting means defined as a part thereof, and another portion which is disposed substantially within the confines of said tank with said housing structure mounted in position against said saddle, said other portion having said inlet disposed with respect to said innermost surface and lowermost portion to enable said complete drainage by gravity.

4. In a valve assembly for a fluid-containing tank which has a mounting saddle fixed to the bottom portion thereof, said valve assembly comprising, a housing structure having a fluid inlet and a fluid outlet defined therein, said inlet and said outlet being interconnected by a flow passage therebetween, means for mounting said housing structure against said saddle and substantially within the confines of said tank, and bottom operable means carried by said housing structure and movable between an open position thereof and a closed position thereof to shut off fluid flow through said flow passage, said inlet and said outlet being defined in said housing structure on a common rectilinear flow axis which is the central axis of said flow passage, said bottom operable means having its closed position at a location between said inlet and said outlet, said bottom operable means once moved to said open position enabling substantially free unobstructed flow of fluid through said valve assembly parallel to said axis and with minimum pressure drop to thereby enable a maximum rate of fluid transfer through said valve assembly, the improvement wherein said inlet of said housing structure is adapted to provide complete drainage of fluid within said tank, said tank has an inside surface and said saddle has an innermost surface which blends smoothly with a lowermost portion of said inside surface, said inlet is disposed with respect to said innermost surface and lowermost portion to enable said complete drainage by gravity, said saddle has a maximum thickness, said housing structure has a thickness over the major portion thereof when viewed parallel to said flow axis which is substantially equal to said maximum thickness, and said housing structure has a downwardly extending portion which extends beneath a bottom annular projection of said mounting saddle with said housing structure mounted in position against said saddle, said downwardly extending portion being sufficiently small to preclude the need for a protective skid for said valve assembly when using same as a lading valve of a railway tank car.

5. A valve assembly as set forth in claim 4 in which said housing structure is the housing structure of a butterfly valve and said bottom operable means is a closure disc of said butterfly valve.

6. A valve assembly as set forth in claim 5 in which said housing structure has an integral bottom portion which has said mounting means defined as a part thereof, said housing structure also has another portion which is disposed substantially within the confines of said tank with said housing structure mounted in position against said saddle, and said other portion has said inlet disposed with respect to said innermost surface and lowermost portion to enable said complete drainage by gravity.

7. In a valve assembly for a fluid-containing tank which has a mounting saddle fixed to the bottom portion thereof, said valve assembly comprising, a housing structure having a fluid inlet and a fluid outlet defined therein, said inlet and said outlet being inter-connected by a flow passage therebetween, means for mounting said housing structure against said saddle and substantially within the confines of said tank, and bottom operable means carried by said housing structure and movable between an open position thereof and a closed position thereof to shut off fluid flow through said flow passage, said inlet and said outlet being defined in said housing structure on a common rectilinear flow axis which is the central axis of said flow passage, said bottom operable means having its closed position at a location between said inlet and said outlet, said bottom operable means once moved to said open position enabling substantially free unobstructed flow of fluid through said valve assembly parallel to said axis and with minimum pressure drop to thereby enable maximum rate of fluid transfer through said valve assembly, the improvement wherein said inlet of said housing structure is adapted to provide complete drainage of fluid within said tank, said tank has an inside surface and said saddle has an innermost surface which blends smoothly with a lowermost portion of said inside surface, said inlet is disposed with respect to said innermost surface and lowermost portion to enable said complete drainage by gravity, said mounting means comprises a mounting surface which is disposed against said saddle, said flow axis extends substantially perpendicular to said mounting surface, and said bottom operable means has actuating stem means disposed inwardly of said mounting surface and within the confines of said tank.

8. A valve assembly as set forth in claim 7 in which said actuating stem means is disposed substantially parallel to said mounting surface and said actuating stem means is a substantially horizontally disposed rotatable actuating stem which is rotatable through an angular increment generally of the order of 90 degrees between its closed and open positions.

9. In a valve assembly for a fluid-containing tank which has a mounting saddle fixed to the bottom portion thereof, said valve assembly comprising, a housing structure having a fluid inlet and a fluid outlet defined therein, said inlet and said outlet being interconnected by a flow passage therebetween, means for mounting said housing structure against said saddle and substantially within the confines of said tank, and bottom operable means carried by said housing structure and movable between an open position thereof and a closed position thereof to shut off fluid flow through said flow passage, said inlet and said outlet being defined in said housing structure on a common rectilinear flow axis which is the central axis of said flow passage, said bottom operable means having its closed position at a location between said inlet and said outlet, said bottom operable means once moved to said open position enabling substantially free unobstructed flow of fluid through said valve assembly parallel to said axis and with minimum pressure drop to thereby enable a maximum rate of fluid transfer through said valve assembly, the improvement wherein said inlet of said housing structure is adapted to provide complete drainage of fluid within said tank, said tank has an inside surface and said saddle has an innermost surface which blends smoothly with a lowermost portion of said inside surface, said inlet is disposed with respect to said innermost surface and lowermost portion to enable said complete drainage by gravity, said housing structure has an integral bottom portion which has said mounting means defined as a part thereof, said mounting means comprises a mounting surface which is disposed against said saddle, said housing structure has a central portion which extends substantially within the confines of said tank from said mounting surface with said housing structure mounted in position, said central portion being divided into roughly two parts separated by a wall which extends perpendicular to said mounting surface, one of said parts having cutout means therein which provides access to said inlet over the major portion thereof and the other of said parts cooperating with said wall to define an inverted cup-shaped portion having an open end which opens to ambient, and said valve assembly further comprises an actuating handle for said bottom operable means, said actuating handle having an inner end which is adapted to be received within said open end and fastened to said bottom operable means, said inverted cup-shaped portion serving to protect at least a portion of said bottom operable means in the event an outer end of said actuating handle is sheared away and said open end enabling access to said portion of said bottom operable means for operation thereof even with said outer end of said actuating handle sheared away.

10. A valve assembly as set forth in claim 8 in which said body structure is the body structure of a butterfly valve; said bottom operable means is a closure disc of said butterfly valve; and further comprising, an actuating stem for said disc, bore means in said wall, said bore means being adapted to receive said actuating stem therethrough in sealed relation so that the outer end of said stem is disposed in said open end of said cup-shaped portion, and means in said outer end of said stem for detachably fastening said inner end of said actuating handle thereto.

11. A valve assembly as set forth in claim 10 and further comprising means in said actuating handle enabling easy shearing of said outer end of said handle at a predetermined and controlled location in the event of the application of a shearing force against said outer end of said handle.

12. A valve assembly as set forth in claim 11 in which; said integral bottom portion of said housing structure has a bottom surface which defines a shear plane; said housing structure has a pair of oppositely arranged cutouts therein; and said actuating handle has an inner end portion which is adapted to be received within said cutouts and has weakening means in its inner end portion; said cutouts having surfaces defining opposed stops which establish fully open and fully closed positions of said valve means; one of said cutouts being associated with the fully closed position of said valve and having surfaces holding said inner end portion of said handle with its weakening means substantially coplanar with said shear plane; whereby in the event shearing forces are applied against said outer end of said handle said weakening means, bottom surface defining said shear plane, and one cutout cooperate to enable efficient shearing of said handle while assuring said actuating stem means and valve means are kept intact and functional.

13. In a butterfly valve assembly for a fluid-containing tank which has a mounting saddle fixed to the bottom portion thereof; said valve assembly comprising; a housing structure having, a fluid flow passage therethrough which has a central rectilinear flow axis, said passage having a fluid inlet and a fluid outlet, said inlet and said outlet having axes common with said central axis, and first sealing surface means comprising said housing structure and being disposed at a location between said inlet and said outlet; means for mounting said housing structure on said saddle; and a bottom operable closure disc for said butterfly valve; the improvement in which; said means for mounting said housing structure on said saddle is adapted to mount said housing structure substantially within the confines of said tank, said bottom operable closure disc for said butterfly valve is carried by said housing structure and has second sealing surface means adapted to engage said first sealing surface means to prevent fluid flow through said passage and define the closed position of said closure disc, said closure disc being movable between an open position thereof and said closed position, said closure disc having its closed position at said location between said inlet and said outlet, said closure disc once moved to said open position enabling substantially free unobstructed flow of fluid through said valve assembly parallel to said axis and with minimum pressure drop to thereby enable a maximum rate of fluid transfer through said valve assembly, said inlet in said housing structure being disposed to assure complete drainage of fluid within said tank, said tank having an inside surface with said saddle having an innermost surface which blends smoothly with a lowermost portion of said inside surface, said inlet being disposed with respect to said innermost surface and lowermost portion to enable said complete drainage by gravity, said saddle having a maximum thickness, said housing structure having a thickness over the major portion thereof when viewed parallel to said flow axis which is substantially equal to said maximum thickness, and said housing structure having a downwardly extending portion which extends beneath a bottom annular projection of said mounting saddle with said housing structure mounted in position against said saddle, said downwardly extending portion being sufficiently small to preclude the need for a protective skid for said valve assembly when using same as a lading valve of a railway tank car.

* * * * *